(12) United States Patent
Zhang et al.

(10) Patent No.: US 11,488,091 B2
(45) Date of Patent: Nov. 1, 2022

(54) CENTRAL CONTROL METHOD AND SYSTEM

(71) Applicant: BEIJING TUSEN ZHITU TECHNOLOGY CO., LTD., Beijing (CN)

(72) Inventors: Yidi Zhang, Beijing (CN); Mingxu Tang, Beijing (CN); Hengliang He, Beijing (CN); Lihu Chen, Beijing (CN); Wanli Song, Beijing (CN); Mengxin Zhu, Beijing (CN); Lu Wang, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 429 days.

(21) Appl. No.: 16/557,389

(22) Filed: Aug. 30, 2019

(65) Prior Publication Data

US 2020/0143311 A1 May 7, 2020

(30) Foreign Application Priority Data

Aug. 31, 2018 (CN) .......................... 201811015425.4

(51) Int. Cl.
*G06Q 10/08* (2012.01)
*G05B 19/418* (2006.01)
*G05D 1/02* (2020.01)

(52) U.S. Cl.
CPC ....... *G06Q 10/083* (2013.01); *G05B 19/4183* (2013.01); *G05D 1/0297* (2013.01);
(Continued)

(58) Field of Classification Search
CPC .............. G06Q 10/083; G05B 19/4183; G05B 2219/31003; G05D 1/0297; G05D 2201/0205; G05D 2201/0216
See application file for complete search history.

(56) References Cited

U.S. PATENT DOCUMENTS 10,242,273 B1 * 3/2019 Eckman ................. G06Q 50/28
10,528,828 B2 * 1/2020 Eckman ............... H04N 13/204
(Continued)

FOREIGN PATENT DOCUMENTS

CN          1470093 A      1/2004
CN        101315731 A     12/2008
(Continued)

OTHER PUBLICATIONS

Chinese Application No. 201811015425.4 Office Action dated Jul. 29, 2019.
(Continued)

*Primary Examiner* — Ramsey Refai
(74) *Attorney, Agent, or Firm* — Paul Liu; Julie J. Muyco; Perkins Coie, LLP

(57) ABSTRACT

Embodiments of the present disclosure provide a central control method. The method includes: obtaining identifications, locations and states of objects in a port; generating and displaying a port electronic map based on the identifications, locations, and states of the objects; and displaying, upon detecting that an object in the port electronic map is being operated, the identification, location, and/or state of the operated object. With the present disclosure, the monitored content can be extended to information, such as identifications, locations and states, related to the respective objects. Compared with the existing port monitoring system, the monitoring is more thorough and comprehensive, which is advantageous for improving port operation security and service execution efficiency. Further, embodiments of the present disclosure provide a central control system.

16 Claims, 4 Drawing Sheets

(52) U.S. Cl.
CPC .............. *G05B 2219/31003* (2013.01); *G05D 2201/0205* (2013.01); *G05D 2201/0216* (2013.01)

(56) References Cited

U.S. PATENT DOCUMENTS

| | | | | |
|---|---|---|---|---|
| 2005/0278062 | A1* | 12/2005 | Janert | G06Q 50/28 |
| | | | | 700/214 |
| 2014/0365258 | A1* | 12/2014 | Vestal | G05D 1/0274 |
| | | | | 901/1 |
| 2015/0242769 | A1* | 8/2015 | Kezeu | G06Q 50/265 |
| | | | | 705/7.11 |
| 2018/0137454 | A1* | 5/2018 | Kulkarni | G08G 1/205 |

FOREIGN PATENT DOCUMENTS

| | | |
|---|---|---|
| CN | 202494451 U | 10/2012 |
| CN | 104732301 A | 6/2015 |
| CN | 207281521 U | 4/2018 |

OTHER PUBLICATIONS

Chinese Application No. 201811015425.4 Office action dated Nov. 28, 2019.

\* cited by examiner

| Vehicle No. | Vehicle State | Speed | Fuel Amount | Task No. | Task State | Health State | Delay |
|---|---|---|---|---|---|---|---|
| | Heading to shore bridge for loading | | | 13(prioritized task) | In Progress | Online | |

| Advanced Search | Add Task | | Quick Search | | Search | In total: 26 operation tasks | | |
|---|---|---|---|---|---|---|---|---|
| Task No. | Task Type | Task State | | Container No. | Container Type | Loading Point | Unloading Point | Operating Vehicle No. |
| | Ship Unloading | To be allocated | | | | | | |
| | Ship Unloading | To be allocated | | | | | | |
| | ... | ... | | | | | | |
| Task State | All | To be allocated | In progress | Completed | | | | |
| Task Type | All | Ship Unloading | Ship Loading | | | | | |

Fig. 7

CENTRAL CONTROL METHOD AND SYSTEM

CROSS-REFERENCE TO RELATED APPLICATION

This patent document claims the benefit of priority of Chinese Patent Application No. 2018/1015425.4, filed Aug. 31, 2018 and entitled "CENTRAL CONTROL METHOD AND CENTRAL CONTROL SYSTEM". The entire content of the before-mentioned patent application is incorporated by reference as part of the disclosure of this application.

TECHNICAL FIELD

Embodiments of the present disclosure relate to unmanned driving technology, and more particularly, to a central control method and a central control system.

BACKGROUND

This section is intended to provide a background or context for the embodiments of the present disclosure as set forth in the claims. The description here is not admitted to be prior art by mere inclusion in this section.

With the continuous development of the unmanned driving technology, more and more unmanned driving products are applied. It is currently one of the research hotspots in the unmanned driving technology to apply the unmanned driving technology to the field of logistics.

SUMMARY

In the process of implementing the present disclosure, the inventors have found that a traditional port generally uses an electronic map provided by a map provider to monitor the situation occurring in real time in the port. Such electronic map can only show information such as a geographical environment of the port and GPS locations of traditional vehicles, but cannot provide information on apparatuses, such as shore cranes and tire cranes, and facilities, such as roads and pipelines in the port. On the other hand, unmanned vehicles have more state information to monitor than conventional vehicles. When the unmanned vehicles are used in the port to perform logistics distribution tasks, the existing electronic map technology cannot satisfy various monitoring requirements for the unmanned vehicles.

In view of this, the present disclosure provides a central control method and a central control system, capable of achieving comprehensive monitoring of a port by obtaining identifications, locations, and states of objects, such as port machinery apparatuses, infrastructures, and unmanned vehicles, in the port in real time.

In this context, the embodiments of the present disclosure are intended to provide a central control method and a central control system.

In a first aspect of the embodiments of the present disclosure, a central control method applied in a port is provided. The method includes: obtaining identifications, locations and states of objects in the port; generating and displaying a port electronic map based on the identifications, locations, and states of the objects; and displaying, upon detecting that an object in the port electronic map is being operated, the identification, location, and/or state of the operated object.

In a second aspect of the embodiments of the present disclosure, a central control system applied in a port is provided. The central control system includes a processor, a memory, and a computer program stored on the memory and executable by the processor. The processor is configured to execute the computer program to perform the above central control method applied in the port.

In a third aspect of the embodiments of the present disclosure, a computer readable storage medium is provided. The computer readable storage medium has a computer program stored thereon. The computer program, when executed by a processor, causes the processor to perform the above central control method applied in a port.

In a fourth aspect of the embodiments of the present disclosure, a central control method applied in a closed logistics distribution area is provided. The method includes: obtaining identifications, locations and states of objects in the closed logistics distribution area; generating and displaying an electronic map based on the identifications, locations, and states of the objects; and displaying, upon detecting that an object in the electronic map is being operated, the identification, location, and/or state of the operated object.

In a fifth aspect of the embodiments of the present disclosure, a central control system applied in a closed logistics distribution area is provided. The central control system includes a processor, a memory, and a computer program stored on the memory and executable by the processor. The processor is configured to execute the computer program to perform the above central control method applied in the closed logistics distribution area.

In a sixth aspect of the embodiments of the present disclosure, a computer readable storage medium is provided. The computer readable storage medium has a computer program stored thereon. The computer program, when executed by a processor, causes the processor to perform the above central control method applied in a closed logistics distribution area.

With the above solutions, the monitored content can be extended to information, such as identifications, locations and states, related to the respective objects. Compared with the existing port monitoring system, the monitoring is more thorough and comprehensive, which is advantageous for improving port operation security and service execution efficiency.

BRIEF DESCRIPTION OF THE DRAWINGS

The above and other objects, features and advantages of the exemplary embodiments of the present disclosure will become more apparent from the following detailed description with reference to the figures. In the figures, a number of embodiments of the present disclosure are shown for illustrating, rather than limiting the present disclosure. In the figures:

FIG. 7 schematically shows a task management interface according to another embodiment of the present disclosure.

In the figures, the same or corresponding reference numerals indicate the same or corresponding parts.

DETAILED DESCRIPTION OF THE EMBODIMENTS

The principles and spirits of the present disclosure will be described below with reference to a number of exemplary embodiments. It is to be understood that the embodiments are presented only to enable those skilled in the art to better understand the present disclosure, instead of limiting the scope of the present disclosure in any way. Rather, these embodiments are provided to make the present disclosure more thorough and complete and to fully convey the scope of the present disclosure to those skilled in the art.

It can be appreciated by those skilled in the art that the embodiments of the present disclosure can be implemented as a system, apparatus, device, method, or computer program product. Accordingly, the present disclosure may be implemented in hardware only, software only (including firmware, resident software, micro codes, etc.), or any combination of hardware and software.

It is to be noted that the term "closed logistics distribution area" as used in the present disclosure refers to an area having a logistics distribution service and being relatively closed when compared with an external environment, including e.g., a highway port, a coastal port, a mine, an airport, a cargo distribution center, a campus, or the like.

The term "and/or" as used herein only describes an association between associated objects. For example, "A and/or B" means A, B or both. For example, "A, B, and/or C" means one or more of A, B, and C.

The principles and spirits of the present disclosure will be explained in detail below. Various non-limiting embodiments of the present disclosure will be specifically described.

Figure 1:
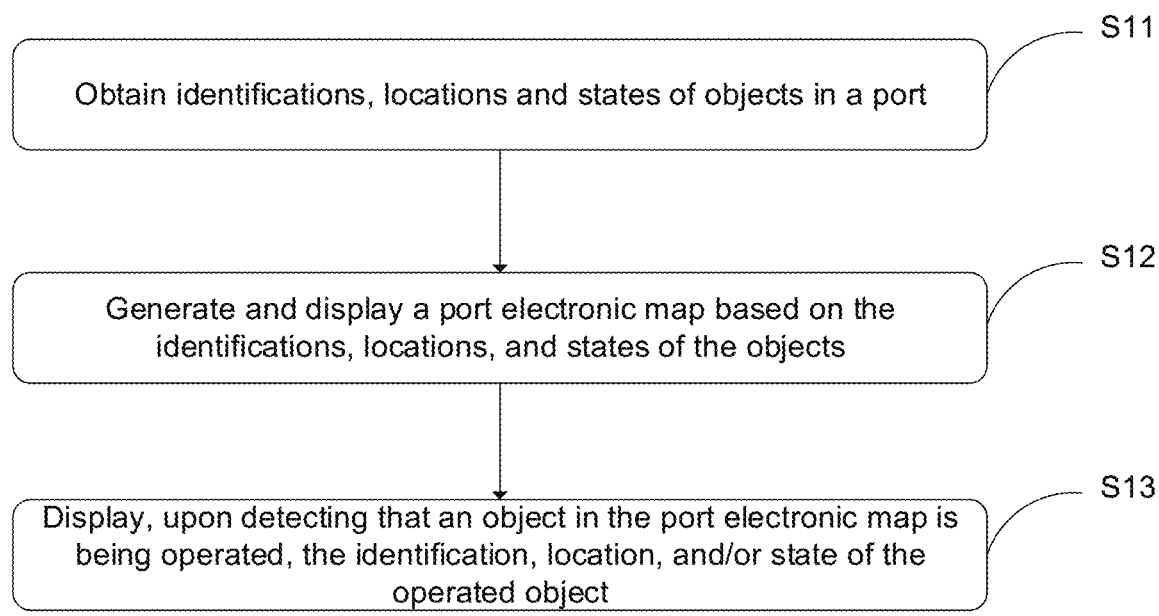
FIG. 1 schematically shows a central control method applied in a port according to an embodiment of the present disclosure.

The present disclosure provides a central control method for monitoring various objects in a port. As shown in FIG. 1, the method includes the following steps.

At step S11, identifications, locations and states of objects in the port are obtained.

Optionally, the objects in the port may include, but not limited to, port machinery apparatuses, infrastructures, and unmanned vehicles.

Here, the port machinery apparatuses may include, but not limited to: reach stackers, empty container handling lift trucks, forklifts, port tire cranes (e.g., tire cranes), grabbers, overhead cranes, gantry cranes, rail-mounted container gantry cranes (e.g., rail-mounted gantry cranes), tire-type container gantry cranes (e.g., tire-type gantry cranes), or shore container cranes (e.g., shore cranes).

The identification of each port machinery apparatus may be an apparatus number, a MAC address, or a combination thereof.

The location of each port machinery apparatus may change. For example, when performing a hoisting task, a shore crane, a tire crane, or a rail-mounted crane may move depending on a location of a container to be hoisted.

The states of each port machinery apparatus may include, but not limited to, one or more of: whether its communication is disconnected, whether it is working, or whether it is malfunctioning.

The infrastructures may include, but not limited to, roads, wharfs, container areas, power supply lines, network transmission lines (e.g., optical cables or copper cables), water supply pipes, fuel supply pipes, natural gas transmission pipes, or gas transmission pipes in the port.

The identification of each infrastructure can be a name, a number, a use, or any combination thereof.

The location of each infrastructure is generally fixed, but in some cases it may also change. For example, a location of a power supply line may change as a new power supply tower is built.

The state of each infrastructure may include, but not limited to, one or more of whether its communication is disconnected, whether it is available, or whether it is malfunctioning. For example, for a road, its real-time state can be: passable (which can be divided into smooth and congested) or closed (which can be divided into maintained and blocked).

The unmanned vehicles are vehicles that use unmanned driving technology to implement cargo functions, such as ordinary trucks, vans, closed trucks, tank trucks, flatbed trucks, container trucks, dump trucks, and special-structure trucks.

The identification of each unmanned vehicle may be a license plate number, a MAC address of a vehicle mounted device, or a combination thereof.

The state of the unmanned vehicle may include, but not limited to, one or more of: whether its communication is disconnected, a driving mode (including autonomous driving, human takeover, human intervention, or the like), a traveling speed, an engine rotation speed, or a remaining fuel amount.

In an implementation, according to the present disclosure, the identifications, locations, and states of the objects can be collected by data collection devices mounted on the objects, and then the information such as the identifications, locations, and states collected by the data collection devices can be obtained by communication devices mounted on the objects. Here, the data collection devices and the communication devices can implement their respective functions based on corresponding protocols. For example, the data collection devices can collect CAN bus data of the port machinery apparatuses, unmanned vehicles, and infrastructures based on the CAN bus protocol. The communication devices can transmit information about the port machinery apparatuses, unmanned vehicles, and infrastructures to the central control system based on various Internet protocols.

At step S12, a port electronic map is generated and displayed based on the identifications, locations, and states of the objects.

Exemplary, in this step, an electronic map can be generated based on the geographic environment of the port, and an icon representing an object can be displayed at a location corresponding to the object in a coordinate system of the electronic map. When the location of the object changes in the real world, the location of the icon representing the object in the electronic map can be updated. In an exemplary implementation, the icon may be a pattern designed according to the real appearance of the object, so as to visually represent the corresponding object in the electronic map.

Figure 2:
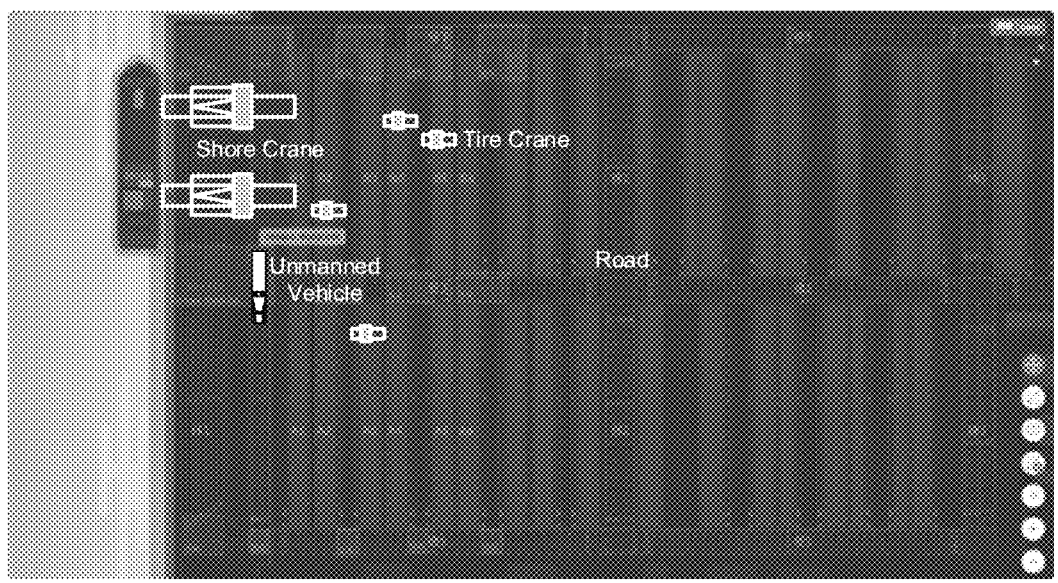
FIG. 2 schematically shows a port electronic map according to an embodiment of the present disclosure.

FIG. 2 shows an embodiment of a port electronic map generated according to the central control method of the present disclosure. As shown in FIG. 2, the port electronic map includes objects such as shore cranes, unmanned vehicles, tire cranes, and roads.

At step S13, upon detecting that an object in the port electronic map is being operated, the identification, location, and/or state (i.e., information such as one of more of the identification, location, and state, referred to as related information hereinafter) of the operated object is displayed.

Exemplary, operations on the port electronic map may include, but not limited to, cursor staying, single-clicking, or double-clicking using an input device (such as a mouse, a keyboard, or a stylus), a user touching a touch screen, and the like.

Exemplary, in this step, when it is determined that the operated object is an unmanned vehicle, the related information of the unmanned vehicle is displayed. When it is determined that the operated object is a port machinery apparatus, the related information of the port machinery apparatus is displayed. When it is determined that the operated object is an infrastructure, the related information of the infrastructure is displayed.

Optionally, the step S12 of generating and displaying the port electronic map based on the identifications, locations, and states of the objects may include: changing a display type of an icon representing an object in the port electronic map when the state of the object changes.

Exemplary, when the state of an object changes from normal to disabled, malfunctioning or disconnected (i.e., the location and state of the object cannot be obtained due to loss of connection), the icon representing the malfunctioning object in the port electronic map can be displayed as a predetermined type, such as flashing or being displayed in a brighter color (than a normal color), so that a user can find out and process it in time. In an embodiment, when an unmanned vehicle is disconnected, the icon representing the unmanned vehicle can be displayed in the form of flashing. In another embodiment, when a road is normally usable, the icon representing the road can be displayed in gray, and when the road is unusable due to a roadblock on the road, the icon of the road can be displayed in red. When there is a roadblock on a road, an icon representing the roadblock can be added at a location of the roadblock on the road. In another embodiment, when a shore crane changes from normally operating to malfunctioning, the icon corresponding to the shore crane can be changed from being displayed in gray to being displayed in yellow.

Optionally, the central control method according to the present disclosure may further include: providing a management interface for each type of objects, for displaying the related information of each object of the type.

Figure 4:
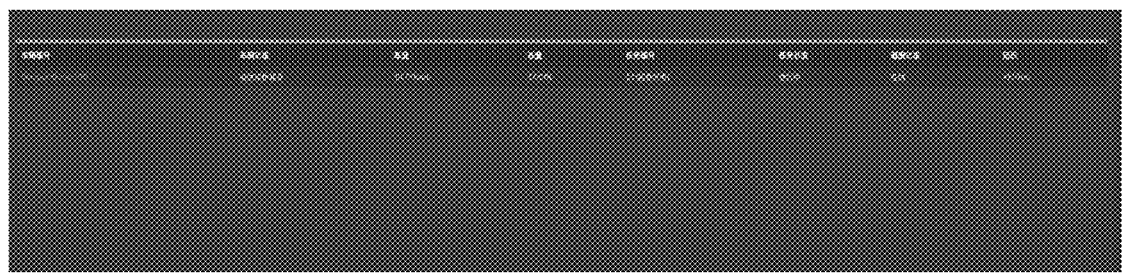
FIG. 4 schematically shows a vehicle management interface according to another embodiment of the present disclosure.

FIG. 4 shows an embodiment of a central control method according to the present disclosure, where a vehicle management interface is provided when an unmanned vehicle is single-clicked in a port electronic map, for displaying related information of each unmanned vehicle in the port. As shown in FIG. 4, the vehicle management interface displays the following information: a vehicle number, a vehicle state, a vehicle speed, a fuel amount, a task number, a task state, a health state, and a delay (i.e., the delay for the unmanned vehicle to respond after receiving a command).

Optionally, the central control method according to the present disclosure may further include: displaying, upon detecting that the object in the port electronic map is being operated, the management interface in a pop-up window with the port electronic map as a background.

Figure 5:
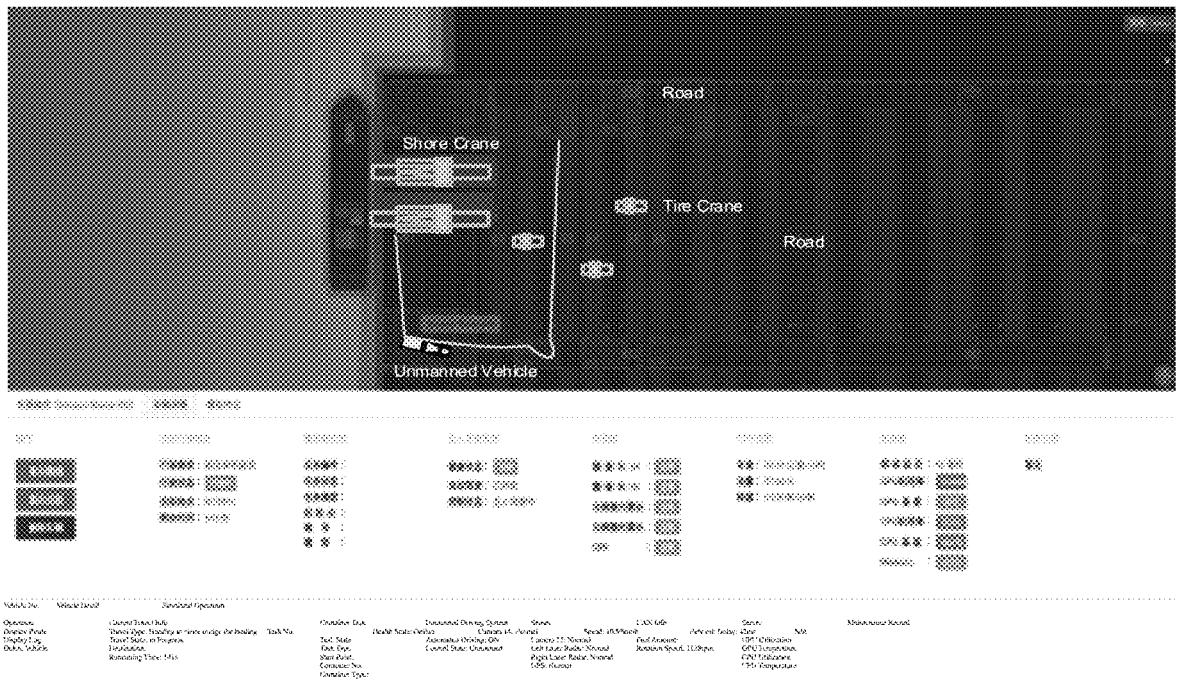
FIG. 5 schematically shows a vehicle management interface having a port electronic map as a background according to another embodiment of the present disclosure.

As shown in FIG. 5, when an unmanned vehicle in the port electronic map is double-clicked, a management interface for the unmanned vehicle is displayed in a pop-up window with the port electronic map as a background.

Optionally, the central control method according to the present disclosure may further include: obtaining a state of an electronic device mounted on each object, and displaying the state of the electronic device in the management interface corresponding to the object.

For example, electronic devices that can be mounted on the port machinery apparatuses and unmanned vehicles may include, but not limited to: CPUs, GPUs, servers, cameras (such as monocular cameras and binocular cameras), radars (laser radars, millimeter wave radars, and ultrasonic radars), Inertial Measurement Units (IMUs), GPS positioning devices, V2X communication devices, and the like.

Electronic devices that can be mounted on the infrastructures may include, but not limited to: CPUs, GPUs, servers, cameras, temperature sensors, humidity sensors, gas alarms, pressure sensors, acceleration sensors, ultraviolet sensors, pH sensors, liquid level sensors, and the like.

The states of the electronic devices may include, but not limited to: whether it is operating normally, whether it is malfunctioning, measured data, GPU utilization, GPU temperature, CPU utilization, CPU temperature, memory usage, and the like.

As shown in FIG. 5, the states and related data of the electronic devices, such as a camera, a laser radar, a GPS, a GPU, and a CPU, are displayed in the management interface for the unmanned vehicle.

Optionally, the central control method according to the present disclosure may further include: generating a log for each object based on the state of the electronic device mounted on the object, and displaying the log in the management interface corresponding to the object.

Here, the log may include, but not limited to: time at which the object starts operating, time at which the object stops operating, time at which the object malfunctions, time at which the malfunction is fixed, a cause of the malfunction, adjustments of parameters for the electronic device mounted on the object, and the like.

Optionally, the central control method according to the present disclosure may further include: receiving a logistics distribution task, and scheduling an unmanned vehicle to execute the logistics distribution task.

In a specific implementation, in this step, an unmanned vehicle can be selected to perform the logistics distribution task, based on loading and unloading addresses of the goods to be distributed in the logistics distribution task, a current location of each unmanned vehicle in the port, and the like.

Optionally, the central control method according to the present disclosure may further include: planning a travel route for the unmanned vehicle executing the logistics distribution task.

Optionally, the central control method according to the present disclosure may further include: displaying the travel route for the unmanned vehicle in the port electronic map when the operated object is the unmanned vehicle executing the logistics distribution task.

Figure 6:
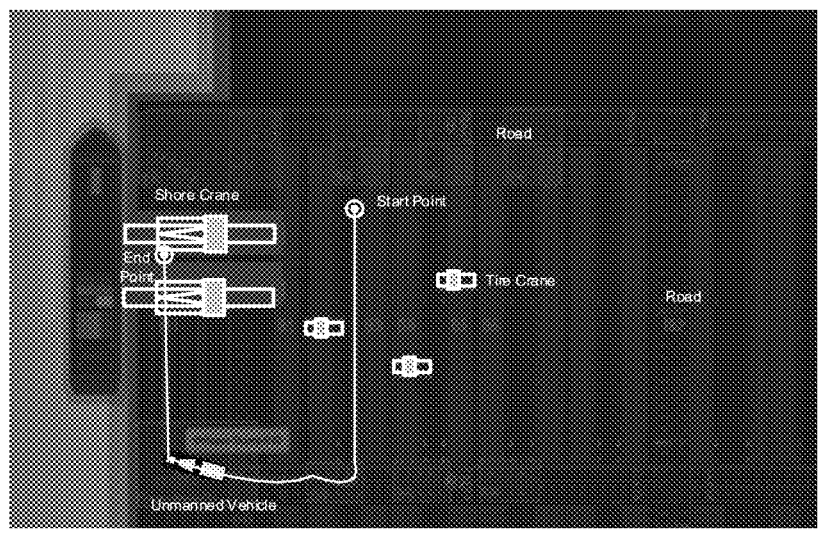
FIG. 6 schematically shows a travel route of an unmanned vehicle as displayed in a port electronic map according to another embodiment of the present disclosure.

As shown in FIG. 6, the line connecting the start point and the end point displayed in the port electronic map indicates the travel route of the operated unmanned vehicle.

Optionally, the central control method according to the present disclosure may further include: extracting detailed information of the logistics distribution task, and providing a task management interface for displaying the detailed information. The detailed information may include one or more of: a task number, a task type, a goods number, a goods type, loading and unloading addresses, and the identification of the unmanned vehicle executing the logistics distribution task.

The information, such as the task number, the task type, the goods number, the goods type, and the loading and unloading addresses can be obtained from an external source, e.g., from a Terminal Operating System (TOS), or can be inputted by a user using an input device. The identification of the unmanned vehicle executing the logistics distribution task can be determined after the unmanned vehicle was selected for the logistics distribution task.

FIG. 7 is a schematic diagram showing an example of a task management interface according to the central control method of the present disclosure. The task management interface includes the following information: task numbers, task types, task states, container numbers, container types, loading points (loading addresses), unloading points (unloading addresses), and executing vehicle numbers.

Optionally, the central control method according to the present disclosure may further include: determining an execution progress of the logistics distribution task based on the location and state of the unmanned vehicle executing the logistics distribution task, and displaying the execution progress in the task management interface.

In a specific implementation, in this step, it can be determined whether the unmanned vehicle is on its way to the loading address, has arrived at the loading address, is on its way to the unloading address, or has arrived at the unloading address based on the location of the unmanned vehicle and changes thereof over time. In turn, it can be determined whether the logistics distribution task is in a state of to be allocated, being executed, or completed. When the logistics distribution task is in the state of being executed, it can be further determined whether the unmanned vehicle is loading or unloading goods based on whether the location of the unmanned vehicle is the loading address or the unloading address and whether the traveling speed and the engine rotation speed of the unmanned vehicle are lower than predetermined speeds.

Optionally, the central control method according to the present disclosure may further include: obtaining a number of goods carried by the unmanned vehicle executing the logistics distribution task, and displaying the identification of the unmanned vehicle in association with the number of goods carried by the unmanned vehicle in the task management interface. In an embodiment, when it is detected that the operated object is an unmanned vehicle executing a logistics distribution task, the identification of the unmanned vehicle and the number of the goods carried by the unmanned vehicle can be displayed in association with each other in the management interface corresponding to the type of unmanned vehicles.

Optionally, the central control method according to the present disclosure may further include: calculating time required for completing the logistics distribution task based on a travel route, a location, and a traveling speed of the unmanned vehicle, and displaying the time in the task management interface. Exemplary, in this step, the time required for the unmanned vehicle to arrive at the loading and unloading addresses may be calculated first based on the travel route of the unmanned vehicle and the location and traveling speed of the unmanned vehicle. Then, the time required for completing the logistics distribution task can be calculated based further on the time required for loading and unloading in the history. In an embodiment, when it is detected that the operated object is an unmanned vehicle executing a logistics distribution task, the identification of the unmanned vehicle and the time required for completing the logistics distribution task can be displayed in association with each other in the management interface corresponding to the type of unmanned vehicles.

Based on the same concept, the present disclosure also provides a central control system for monitoring various objects in a port, which will be described in detail below.

The present disclosure provides a central control system applied in a port. The central control system includes a first processor, a first memory, and a computer program stored on the first memory and executable by the first processor. The first processor is configured to execute the computer program to: obtain identifications, locations and states of objects in a port; generate and display a port electronic map based on the identifications, locations, and states of the objects; and display, upon detecting that an object in the port electronic map is being operated, the identification, location, and/or state of the operated object.

The method the first processor is configured to perform when executing the computer program is implemented based on the same concept as the above central control method shown in FIG. 1 and has the same non-limiting embodiments as the above central control method shown in FIG. 1. For further details, reference can be made to the method as described above in connection with FIG. 1 and the description thereof will be omitted here.

Optionally, in the present disclosure, the first processor may be implemented as a circuit, a chip or any other electronic component. For example, the first processor may also include one or more microcontrollers, one or more Field Programmable Gate Arrays (FPGAs), one or more Application Specific Integrated Circuits (ASICs), one or more Digital Signal Processors (DSPs), one or more integrated circuits, and the like.

Optionally, in the present disclosure, the first memory may be implemented as a circuit, a chip or any other electronic component. For example, the first memory can include one or more Read Only Memories (ROMs), Random Access Memories (RAMs), flash memories, Electrically Programmable ROMs (EPROMs), Electrically Programmable and Erasable ROMs (EEPROMs), embedded Multi-Media Cards (eMMCs), hard drives or any volatile or non-volatile mediums.

Based on the idea of the present disclosure, the present disclosure also provides a computer readable storage medium. The computer readable storage medium has a computer program stored thereon. The computer program, when executed by a processor, causes the processor to perform the central control method shown in FIG. 1. The storage medium may be one or more Read Only Memories (ROMs), Random Access Memories (RAMs), flash memories, Electrically Programmable ROMs (EPROMs), Electrically Programmable and Erasable ROMs (EEPROMs), embedded Multi-Media Cards (eMMCs), hard drives or any volatile or non-volatile mediums.

In summary, the central control method applied in a port and the central control system applied in a port according to the embodiments of the present disclosure have the following advantageous effects.

(1) The monitored content can be extended to the information, such as identifications, locations and states, related to the respective objects. Compared with the existing port monitoring system, the monitoring is more thorough and comprehensive, which is advantageous for improving port operation security and service execution efficiency.

(2) The monitored objects are extended to objects such as port machinery apparatuses, infrastructures and unmanned vehicles, which is advantageous for acquiring real-time situations of the respective port machinery apparatuses, infrastructures and unmanned vehicles, such that a timely response can be made in the event of malfunctions or disconnections.

(3) A management interface is provided for each type of objects, which is advantageous for unified management of different types of objects.

(4) The states of various electronic devices mounted on the objects can be monitored, so as to acquire real-time situations of the electronic devices and determine whether the electronic devices are malfunctioning and the causes of the malfunctions, which is advantageous for solving the problems timely and allow the electronic devices to resume operating.

(5) An unmanned vehicle can be automatically selected to perform a logistics distribution task, thereby improving the execution efficiency of the logistics distribution service in the port, and thus the cargo throughput of the port.

(6) Based on the monitored related information of the respective objects, a travel route can be automatically planned for the unmanned vehicle executing the logistics distribution task, thereby improving the resource utilization and reducing the logistics distribution cost, while providing a visual view of the travel route in the port electronic map.

(7) The execution progress and the time required for the logistics distribution task can be calculated based on the obtained related information of the unmanned vehicle. A task management interface can be provided to display the detailed information and the execution progress of the logistics distribution task, which is advantageous for timely acquiring the details and progress of the logistics distribution task, so as to improve the efficiency of the logistics distribution.

Based on the same concept, the present disclosure also provides a central control method, which can be applied to any relatively closed area, such as a highway port, a coastal port, a mine, an airport, a cargo distribution center, a campus, or the like.

Figure 3:
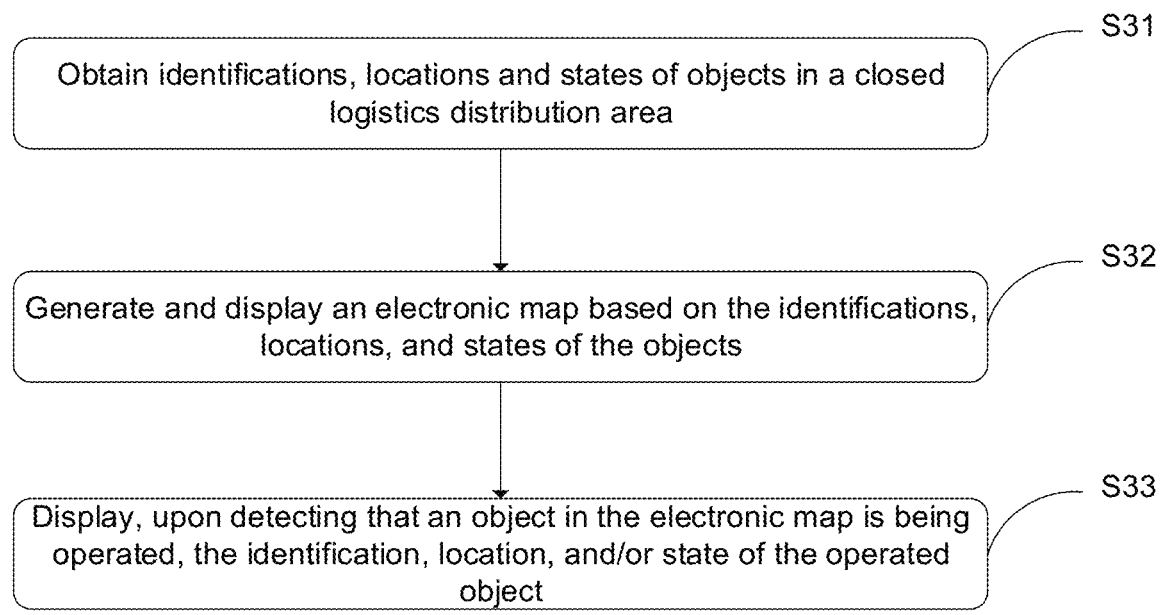
FIG. 3 schematically shows a central control method applied in a closed logistics distribution area according to another embodiment of the present disclosure.

As shown in FIG. 3, the central control method includes the following steps.

At step S31: identifications, locations and states of objects in a closed logistics distribution area are obtained.

Optionally, the objects in the closed logistics distribution area may include, but not limited to, loading/unloading apparatuses, infrastructures, and unmanned vehicles.

The loading/unloading apparatuses as used herein refer to devices for loading, unloading, moving, and lifting goods in the closed logistics distribution area, including e.g., forklifts, cranes, elevators, conveyors, trucks, and computer-controlled mechanical arms having moving functions.

Optionally, the loading/unloading apparatuses may include, but not limited to: reach stackers, empty container handling lift trucks, forklifts, port tire cranes (e.g., tire cranes), grabbers, overhead cranes, gantry cranes, rail-mounted container gantry cranes (e.g., rail-mounted gantry cranes), tire-type container gantry cranes (e.g., tire-type gantry cranes), or shore container cranes (e.g., shore cranes).

The identification of each loading/unloading apparatus may be an apparatus number, a MAC address, or a combination thereof.

The location of each loading/unloading apparatus may change, depending on a location of goods to be loaded, unloaded, moved, or lifted.

The states of each loading/unloading apparatus may include, but not limited to, one or more of: whether its communication is disconnected, whether it is working, or whether it is malfunctioning.

The infrastructures may include, but not limited to, roads, wharfs, container areas, power supply lines, network transmission lines (e.g., optical cables or copper cables), water supply pipes, fuel supply pipes, natural gas transmission pipes, or gas transmission pipes in the closed logistics distribution area.

The identification of each infrastructure can be a name, a number, a use, or any combination thereof.

The location of each infrastructure is generally fixed, but in some cases it may also change. For example, a location of a power supply line may change as a new power supply tower is built.

The state of each infrastructure may include, but not limited to, one or more of whether its communication is disconnected, whether it is available, or whether it is malfunctioning. For example, for a road, its real-time state can be: passable (which can be divided into smooth and congested) or closed (which can be divided into maintained and blocked).

The unmanned vehicles are vehicles that use unmanned driving technology to implement cargo functions, such as ordinary trucks, vans, closed trucks, tank trucks, flatbed trucks, container trucks, dump trucks, and special-structure trucks.

The identification of each unmanned vehicle may be a license plate number, a MAC address of a vehicle mounted device, or a combination thereof.

The state of the unmanned vehicle may include, but not limited to, one or more of: whether its communication is disconnected, a driving mode (including automated driving, human takeover, human intervention, or the like), a traveling speed, an engine rotation speed, or a remaining fuel amount.

In an exemplary implementation, according to the present disclosure, the identifications, locations, and states of the objects can be collected by mounting data collection devices on the objects, and then the information such as the identifications, locations, and states collected by the data collection devices can be obtained by mounting communication devices on the objects. Here, the data collection devices and the communication devices can implement their respective functions based on corresponding protocols. For example, the data collection devices can collect CAN bus data of the loading/unloading apparatuses, unmanned vehicles, and infrastructures based on the CAN bus protocol. The communication devices can transmit information about the loading/unloading apparatuses, unmanned vehicles, and infrastructures to the central control system based on various Internet protocols.

At step S32, an electronic map is generated and displayed based on the identifications, locations, and states of the objects.

Exemplary, in this step, an electronic map can be generated based on the geographic environment of the closed logistics distribution area, and an icon representing an object can be displayed at a location corresponding to the object in a coordinate system of the electronic map. When the location of the object changes in the real world, the location of the icon representing the object in the electronic map can be updated. In a specific implementation, the icon may be a pattern designed according to the real appearance of the object, so as to visually represent the corresponding object in the electronic map.

At step S33, upon detecting that an object in the electronic map is being operated, the identification, location, and/or state (i.e., information such as one or more of the identification, location, and state, referred to as related information hereinafter) of the operated object is displayed.

Exemplary, operations on the electronic map may include, but not limited to, cursor staying, single-clicking, or double-clicking using an input device (such as a mouse, a keyboard, or a stylus), a user touching a touch screen, and the like.

Exemplary, in this step, when it is determined that the operated object is an unmanned vehicle, the related information of the unmanned vehicle is displayed. When it is determined that the operated object is a loading/unloading apparatus, the related information of the loading/unloading apparatus is displayed. When it is determined that the operated object is an infrastructure, the related information of the infrastructure is displayed.

Optionally, the step S32 of generating and displaying the electronic map based on the identifications, locations, and states of the objects may include: changing a display type of an icon representing an object in the electronic map when the state of the object changes.

Exemplary, when the state of an object changes from normal to disabled, malfunctioning or disconnected (i.e., the location and state of the object cannot be obtained due to loss of connection), the icon representing the malfunctioning object in the electronic map can be displayed as a predetermined type, such as flashing or being displayed in a brighter color (than a normal color), so that a user can find out and process it in time. In an embodiment, when an unmanned vehicle is disconnected, the icon representing the unmanned vehicle can be displayed in the form of flashing. In another embodiment, when a road is normally usable, the icon representing the road can be displayed in gray, and when the road is unusable due to a roadblock on the road, the icon of the road can be displayed in red. In another embodiment, when a forklift changes from normally operating to malfunctioning, the icon corresponding to the forklift can be changed from being displayed in gray to being displayed in yellow.

Optionally, the central control method according to the present disclosure may further include: providing a management interface for each type of objects, for displaying the related information of each object of the type.

Optionally, the central control method according to the present disclosure may further include: displaying, upon detecting that the object in the electronic map is being operated, the management interface in a pop-up window with the electronic map as a background.

Optionally, the central control method according to the present disclosure may further include: obtaining a state of an electronic device mounted on each object, and displaying the state of the electronic device in the management interface corresponding to the object.

For example, electronic devices that can be mounted on the loading/unloading apparatuses and unmanned vehicles may include, but not limited to: CPUs, GPUs, servers, cameras (such as monocular cameras and binocular cameras), radars (laser radars, millimeter wave radars, and ultrasonic radars), Inertial Measurement Units (IMUs), GPS positioning devices, V2X communication devices, and the like.

Electronic devices that can be mounted on the infrastructures may include, but not limited to: CPUs, GPUs, servers, cameras, temperature sensors, humidity sensors, gas alarms, pressure sensors, acceleration sensors, ultraviolet sensors, pH sensors, liquid level sensors, and the like.

The states of the electronic devices may include, but not limited to: whether it is operating normally, whether it is malfunctioning, measured data, GPU utilization, GPU temperature, CPU utilization, CPU temperature, memory usage, and the like.

Optionally, the central control method according to the present disclosure may further include: generating a log for each object based on the state of the electronic device mounted on the object, and displaying the log in the management interface corresponding to the object.

Here, the log may include, but not limited to: time at which the object starts operating, time at which the object stops operating, time at which the object malfunctions, time at which the malfunction is fixed, a cause of the malfunction, adjustments of parameters for the electronic device mounted on the object, and the like.

Optionally, the central control method according to the present disclosure may further include: receiving a logistics distribution task, and scheduling an unmanned vehicle to execute the logistics distribution task.

In an exemplary implementation, in this step, an unmanned vehicle can be selected to perform the logistics distribution task, based on loading and unloading addresses of the goods to be distributed in the logistics distribution task, a current location of each unmanned vehicle in the closed logistics distribution area, and the like.

Optionally, the central control method according to the present disclosure may further include: planning a travel route for the unmanned vehicle executing the logistics distribution task.

Optionally, the central control method according to the present disclosure may further include: displaying the travel route for the unmanned vehicle in the electronic map when the operated object is the unmanned vehicle executing the logistics distribution task.

Optionally, the central control method according to the present disclosure may further include: extracting detailed information of the logistics distribution task, and providing a task management interface for displaying the detailed information. The detailed information may include one or more of: a task number, a task type, a goods number, a goods type, loading and unloading addresses, and the identification of the unmanned vehicle executing the logistics distribution task.

The information, such as the task number, the task type, the goods number, the goods type, and the loading and unloading addresses can be obtained from an external source, e.g., from an existing logistics management system, or can be inputted by a user using an input device. The identification of the unmanned vehicle executing the logistics distribution task can be determined after the unmanned vehicle was selected for the logistics distribution task.

Optionally, the central control method according to the present disclosure may further include: determining an execution progress of the logistics distribution task based on the location and state of the unmanned vehicle executing the logistics distribution task, and displaying the execution progress in the task management interface.

In a specific implementation, in this step, it can be determined whether the unmanned vehicle is on its way to the loading address, has arrived at the loading address, is on its way to the unloading address, or has arrived at the unloading address based on the location of the unmanned vehicle and changes thereof over time. In turn, it can be determined whether the logistics distribution task is in a state of to be allocated, being executed, or completed. When the logistics distribution task is in the state of being executed, it can be further determined whether the unmanned vehicle is loading or unloading goods based on whether the location of the unmanned vehicle is the loading address or the unloading address and whether the traveling speed and the engine rotation speed of the unmanned vehicle are lower than predetermined speeds.

Optionally, the central control method according to the present disclosure may further include: obtaining a number of goods carried by the unmanned vehicle executing the logistics distribution task, and displaying the identification of the unmanned vehicle in association with the number of goods carried by the unmanned vehicle in the task management interface. In an embodiment, when it is detected that the operated object is an unmanned vehicle executing a logistics distribution task, the identification of the unmanned vehicle and the number of the goods carried by the unmanned vehicle can be displayed in association with each other in the management interface corresponding to the type of unmanned vehicles.

Optionally, the central control method according to the present disclosure may further include: calculating time required for completing the logistics distribution task based on a travel route, a location, and a traveling speed of the unmanned vehicle, and displaying the time in the task management interface. Exemplary, in this step, the time required for the unmanned vehicle to arrive at the loading and unloading addresses may be calculated first based on the travel route of the unmanned vehicle and the location and traveling speed of the unmanned vehicle. Then, the time required for completing the logistics distribution task can be calculated based further on the time required for loading and unloading in the history. In an embodiment, when it is detected that the operated object is an unmanned vehicle executing a logistics distribution task, the identification of the unmanned vehicle and the time required for completing the logistics distribution task can be displayed in association with each other in the management interface corresponding to the type of unmanned vehicles.

Based on the same concept, the present disclosure also provides a central control system for monitoring various objects in a closed logistics distribution area, which will be described in detail below.

The present disclosure provides a central control system applied in a closed logistics distribution area. The central control system includes a second processor, a second memory, and a computer program stored on the second memory and executable by the second processor. The second processor is configured to execute the computer program to: obtain identifications, locations and states of objects in a closed logistics distribution area; generate and display an electronic map based on the identifications, locations, and states of the objects; and display, upon detecting that an object in the electronic map is being operated, the identification, location, and/or state of the operated object.

The method the second processor is configured to perform when executing the computer program is implemented based on the same concept as the above central control method shown in FIG. 3 and has the same non-limiting embodiments as the above central control method shown in FIG. 3. For further details, reference can be made to the method as described above in connection with FIG. 3 and the description thereof will be omitted here.

Optionally, in the present disclosure, the second processor may be implemented as a circuit, a chip or any other electronic component. For example, the second processor may also include one or more microcontrollers, one or more Field Programmable Gate Arrays (FPGAs), one or more Application Specific Integrated Circuits (ASICs), one or more Digital Signal Processors (DSPs), one or more integrated circuits, and the like.

Optionally, in the present disclosure, the second memory may be implemented as a circuit, a chip or any other electronic component. For example, the second memory can include one or more Read Only Memories (ROMs), Random Access Memories (RAMs), flash memories, Electrically Programmable ROMs (EPROMs), Electrically Programmable and Erasable ROMs (EEPROMs), embedded Multi-Media Cards (eMMCs), hard drives or any volatile or non-volatile mediums.

Based on the idea of the present disclosure, the present disclosure also provides a computer readable storage medium. The computer readable storage medium has a computer program stored thereon. The computer program, when executed by a processor, causes the processor to perform the central control method shown in FIG. 3. The storage medium may be one or more Read Only Memories (ROMs), Random Access Memories (RAMs), flash memories, Electrically Programmable ROMs (EPROMs), Electrically Programmable and Erasable ROMs (EEPROMs), embedded Multi-Media Cards (eMMCs), hard drives or any volatile or non-volatile mediums.

The central control method applied in a closed logistics distribution area and the central control system applied in a closed logistics distribution area according to the embodiments of the present disclosure have the following advantageous effects.

(1) The monitored content can be extended to the information, such as identifications, locations and states, related to the respective objects. Compared with the existing monitoring system, the monitoring is more thorough and comprehensive, which is advantageous for improving operation security and service execution efficiency in the closed logistics distribution area.

(2) The monitored objects are extended to objects such as loading/unloading apparatuses, infrastructures and unmanned vehicles, which is advantageous for acquiring real-time situations of the respective loading/unloading apparatuses, infrastructures and unmanned vehicles, such that a timely response can be made in the event of malfunctions or disconnections.

(3) A management interface is provided for each type of objects, which is advantageous for unified management of different types of objects;

(4) The states of various electronic devices mounted on the objects can be monitored, so as to acquire real-time situations of the electronic devices and determine whether the electronic devices are malfunctioning and the causes of the malfunctions, which is advantageous for solving the problems timely and allow the electronic devices to resume operating.

(5) An unmanned vehicle can be automatically selected to perform a logistics distribution task, thereby improving the execution efficiency of the logistics distribution service, and thus the cargo throughput of the closed logistics distribution area.

(6) Based on the monitored related information of the respective objects, a travel route can be automatically planned for the unmanned vehicle executing the logistics distribution task, thereby improving the resource utilization and reducing the logistics distribution cost, while providing a visual view of the travel route in the electronic map of the closed logistics distribution area.

(7) The execution progress and the time required for the logistics distribution task can be calculated based on the obtained related information of the unmanned vehicle. A task management interface can be provided to display the detailed information and the execution progress of the logistics distribution task, which is advantageous for timely acquiring the details and progress of the logistics distribution task, so as to improve the efficiency of the logistics distribution.

It should be noted that while the operations of the methods according to the present disclosure have been described in particular orders in the figures, it does not require or imply that these operations are necessarily to be performed in the particular orders, or that all the illustrated operations are necessarily to be performed to achieve the desired results. Additionally or alternatively, some steps may be omitted, a plurality of steps may be combined into one step, and/or one step may be divided into a plurality of steps for execution.

While the spirits and principles of the present disclosure have been described with reference to the embodiments of the present disclosure, it is to be understood that the present disclosure is not limited to the disclosed embodiments. The division into various aspects is for the convenience of expression only, but does not mean that the features in different aspects cannot be combined to achieve advantageous results. The present disclosure is intended to cover various modifications and equivalents that fall within the spirit and scope of the claims as attached.

The above described embodiments are provided for explaining the objects, solutions and advantageous effects of the present disclosure in further detail. It is to be understood that the above embodiments of the present disclosure are illustrative only, rather than limiting the scope of the present disclosure. All modifications, equivalent, or improvements made within the spirit and scope of the present disclosure are to be encompassed by the scope of the present disclosure.

It can be appreciated by those skilled in the art that various illustrative logical blocks, units, and steps listed in the embodiments of the present disclosure can be implemented by electronic hardware, computer software, or any combination thereof. To clearly illustrate the interchangeability of hardware and software, the various illustrative components, units and steps described above have been generally described with respect to their functions. Whether such functions are to be implemented by hardware or software depends on design requirements of particular applications and the overall system. It can be appreciated by those skilled in the art that for each particular application, the described functions can be implemented using various methods, and such implementations should not be construed as being beyond the scope of the embodiments of the present disclosure.

The various illustrative logic blocks, or units, or devices described in the embodiments of the present disclosure may be implemented by general purpose processors, digital signal processors, Application Specific Integrated Circuits (ASICs), field programmable gate arrays or other programmable logic devices, discrete gates or transistor logics, discrete hardware components, or any combination or design thereof, so as to implement or operate the described functions. A general purpose processor may be a microprocessor. Alternatively, the general purpose processor may be any conventional processor, controller, microcontroller, or state machine. The processor may also be implemented by a combination of computing devices, such as a digital signal processor and a microprocessor, a plurality of microprocessors, one or more microprocessors in combination with a digital signal processor core, or any other similar configurations.

The steps of the method or algorithm described in the embodiments of the present disclosure may be directly embedded in hardware or software modules executed by a processor, or any combination thereof. The software modules can be stored in a RAM, a flash memory, a ROM, an EPROM, an EEPROM, a register, a hard drive, a removable magnetic disk, a CD-ROM, or any other form of storage medium in the art. As an example, the storage medium can be coupled to a processor such that the processor can read information from the storage medium and write information to the storage medium. Alternatively, the storage medium can be integrated into the processor. The processor and the storage medium may be disposed in an ASIC, which can be provided in a user terminal. Alternatively, the processor and the storage medium may also be provided in different components in the user terminal.

In one or more exemplary designs, the functions described above in the embodiments of the present disclosure may be implemented in hardware, software, firmware, or any combination thereof. When implemented in software, these functions may be stored on a computer readable medium or transmitted as one or more instructions or codes to a computer readable medium. Computer readable mediums may include computer storage mediums and communication mediums that facilitates transfer of computer programs from one place to another. The storage medium can be any available medium that any general purpose or special computer can access. For example, such computer readable mediums may include, but not limited to: RAMs, ROMs, EEPROMs, CD-ROMs or other optical storages, magnetic disk storages or other magnetic storage devices, or any other medium that can be used for carrying or storing program codes in instructions, data structures or any other forms that can be read by a general purpose or special computer or a general purpose or special processor. In addition, any connection can be appropriately defined as a computer readable medium. For example, if the software is transmitted from a website, a server, or any other remote sources through a coaxial cable, a fiber optic cable, a twisted pair, a Digital Subscriber Line (DSL) or wirelessly via e.g., infrared, radio, or microwave, it is also included in the defined computer readable medium. The disks and discs include compact disks, laser discs, optical discs, DVDs, floppy disks, and Blu-ray discs. The disks typically replicate data magnetically, while the discs typically optically replicate data with a laser. Any combination of the above may also be included in a computer readable medium.

What is claimed is:

1. A central control method, comprising:
    obtaining identifications, locations and states of objects in a port by a central control system;
    generating and displaying, by the central control system, a port electronic map based on the identifications, locations, and states of the objects;
    displaying, by the central control system, upon detecting that an object in the port electronic map is being operated, the state of the operated object;
    providing, by the central control system, a management interface for each type of object for displaying the state of each object of the type; and
    obtaining, by the central control system, a state of an electronic device mounted on each object, and displaying the state of the electronic device in the management interface corresponding to the object, wherein the objects comprise unmanned vehicles, and the states of each unmanned vehicle comprise one or more of: a driving mode, a traveling speed, an engine rotation speed, and a remaining fuel amount.

2. The method of claim 1, wherein the objects further comprise port machinery apparatuses and infrastructures.

3. The method of claim 2, wherein:
the port machinery apparatuses comprise one or more of: reach stackers, empty container handling lift trucks, forklifts, port tire cranes, grabbers, overhead cranes, gantry cranes, rail-mounted container gantry cranes, tire-type container gantry cranes, or shore container cranes,
the states of each port machinery apparatus comprise: whether its communication is disconnected, whether it is working, and/or whether it is malfunctioning,
the infrastructures comprise one or more of: roads, wharfs, container areas, power supply lines, network transmission lines, water supply pipes, fuel supply pipes, natural gas transmission pipes, or gas transmission pipes in the port, and
the states of each infrastructure comprise: whether its communication is disconnected, whether it is available, and/or whether it is malfunctioning.

4. The method of claim 1, wherein said generating and displaying the port electronic map based on the identifications, locations, and states of the objects comprises
changing a display type of an icon representing an object in the port electronic map when the state of the object changes.

5. The method of claim 1, further comprising:
displaying, upon detecting that the object in the port electronic map is being operated, the identification and location of the operated object.

6. The method of claim 1, further comprising:
displaying, upon detecting that the object in the port electronic map is being operated, the management interface in a pop-up window with the port electronic map as a background.

7. The method of claim 1,
wherein the management interface is further for displaying the identification and location of each object of the type.

8. The method of claim 1, further comprising:
receiving a logistics distribution task, and scheduling the unmanned vehicle to execute the logistics distribution task.

9. The method of claim 8, further comprising:
planning a travel route for the unmanned vehicle executing the logistics distribution task.

10. The method of claim 9, further comprising:
displaying the travel route for the unmanned vehicle in the port electronic map when the operated object is the unmanned vehicle executing the logistics distribution task.

11. The method of claim 8, further comprising:
extracting detailed information of the logistics distribution task, and providing a task management interface for displaying the detailed information,
wherein the detailed information comprises one or more of: a task number, a task type, a goods number, a goods type, loading and unloading addresses, and the identification of the unmanned vehicle executing the logistics distribution task.

12. The method of claim 11, further comprising:
determining an execution progress of the logistics distribution task based on the location and state of the unmanned vehicle executing the logistics distribution task, and displaying the execution progress in the task management interface.

13. The method of claim 11, further comprising:
obtaining a number of goods carried by the unmanned vehicle executing the logistics distribution task, and displaying the identification of the unmanned vehicle in association with the number of goods carried by the unmanned vehicle in the task management interface.

14. The method of claim 11, further comprising:
calculating time required for completing the logistics distribution task based on a travel route, a location, and a traveling speed of the unmanned vehicle, and displaying the time in the task management interface.

15. A central control system, comprising a processor, a memory, and a computer program stored on the memory and executable by the processor, wherein the computer program, when executed by the processor performs steps comprising:
obtaining identifications, locations and states of objects in a port;
generating and displaying a port electronic map based on the identifications, locations, and states of the objects;
displaying, upon detecting that an object in the port electronic map is being operated, the state of the operated object;
providing a management interface for each type of object, for displaying the state of each object of the type; and
obtaining a state of an electronic device mounted on each object, and displaying the state of the electronic device in the management interface corresponding to the object, wherein the objects comprise unmanned vehicles, and the states of each unmanned vehicle comprise one or more of: a driving mode, a traveling speed, an engine rotation speed, and a remaining fuel amount.

16. A non-transitory computer readable storage medium having a computer program stored thereon, wherein the computer program, when executed by a processor, performs steps comprising:
obtaining, by a central control system comprising the non-transitory computer readable storage medium, identifications, locations and states of objects in a port;
generating and displaying a port electronic map based on the identifications, locations, and states of the objects by the central control system;
displaying, by the central control system, upon detecting that an object in the port electronic map is being operated, the state of the operated object;
providing, by the central control system, a management interface for each type of object, for displaying the state of each object of the type; and
obtaining, by the central control system, a state of an electronic device mounted on each object, and displaying the state of the electronic device in the management interface corresponding to the object, wherein the objects comprise unmanned vehicles, and the states of each unmanned vehicle comprise one or more of: a driving mode, a traveling speed, an engine rotation speed, and a remaining fuel amount.

* * * * *

UNITED STATES PATENT AND TRADEMARK OFFICE
CERTIFICATE OF CORRECTION

| | |
|---|---|
| PATENT NO. | : 11,488,091 B2 |
| APPLICATION NO. | : 16/557389 |
| DATED | : November 1, 2022 |
| INVENTOR(S) | : Yidi Zhang et al. |

It is certified that error appears in the above-identified patent and that said Letters Patent is hereby corrected as shown below:

In the Specification

• In Column 1, Line 8, delete "2018/1015425.4," and insert -- 201811015425.4, --, therefor.

Signed and Sealed this
Twenty-first Day of February, 2023

Katherine Kelly Vidal
*Director of the United States Patent and Trademark Office*